United States Patent
Tysman et al.

(10) Patent No.: US 11,428,275 B2
(45) Date of Patent: Aug. 30, 2022

(54) WET CLUTCH LUBRICATION EVACUATION

(71) Applicant: Allison Transmission, Inc., Indianapolis, IN (US)

(72) Inventors: John L. Tysman, Zionsville, IN (US); Debera Schroeder, Speedway, IN (US); Drew Nicholas, Petoskey, MI (US)

(73) Assignee: Allison Transmission, Inc., Indianapolis, IN (US)

(*) Notice: Subject to any disclaimer, the term of this patent is extended or adjusted under 35 U.S.C. 154(b) by 0 days.

(21) Appl. No.: 16/952,283

(22) Filed: Nov. 19, 2020

(65) Prior Publication Data

US 2022/0154784 A1    May 19, 2022

(51) Int. Cl.
| | |
|---|---|
| *F16D 25/0635* | (2006.01) |
| *F16D 25/12* | (2006.01) |
| *F16D 25/0638* | (2006.01) |
| F16D 25/10 | (2006.01) |
| F16D 13/74 | (2006.01) |

(52) U.S. Cl.
CPC ....... *F16D 25/123* (2013.01); *F16D 25/0638* (2013.01); *F16D 13/74* (2013.01); *F16D 25/0635* (2013.01); *F16D 25/10* (2013.01); *F16D 2300/0214* (2013.01); *F16D 2300/22* (2013.01)

(58) Field of Classification Search
CPC .... F16D 25/123; F16D 25/0635; F16D 25/10; F16D 2300/0214; F16D 2300/22
See application file for complete search history.

(56) References Cited

U.S. PATENT DOCUMENTS

| | | | |
|---|---|---|---|
| 3,470,988 A | 10/1969 | Sieverkropp | |
| 5,495,927 A | 3/1996 | Samie et al. | |
| 11,111,992 B2 * | 9/2021 | Steiner | ............... F16D 21/00 |
| 2008/0308374 A1 | 12/2008 | Heukelbach et al. | |
| 2009/0050437 A1 * | 2/2009 | Fujita | ............... F16D 25/0638 |
| | | | 192/85.29 |

(Continued)

FOREIGN PATENT DOCUMENTS

DE    102005051739 A1    5/2007

OTHER PUBLICATIONS

German Patent and Trade Mark Office; German Office Action; German Application No. 102021129664.1; dated Dec. 16, 2021.

*Primary Examiner* — Stacey A Fluhart
*Assistant Examiner* — Farhana Pervin
(74) *Attorney, Agent, or Firm* — Faegre Drinker Biddle & Reath LLP

(57) ABSTRACT

A wet clutch system includes fluid-flow apertures in the clutch piston which allow for reduction of oil shear forces between rotating clutch plates and a stationary piston. In particular the apertures pass through the piston in the area of the piston's engagement with the clutch plates. When the piston is in its deactivated position and spaced from the clutch plates, the radially-outward position of these apertures allows high-pressure, centrifugally-driven clutch fluid to migrate away from the clutch plates through the piston to a backfill cavity on the opposite side of the piston. An air-inlet aperture may be provided in or near the clutch hub to facilitate this oil migration.

21 Claims, 7 Drawing Sheets

(56) References Cited

U.S. PATENT DOCUMENTS

2014/0216880 A1* 8/2014 Greathouse ............ F16H 45/02
192/3.29
2019/0044410 A1* 2/2019 Vanni ....................... B60K 6/48
2019/0178357 A1* 6/2019 Horen ..................... F16H 61/14
2019/0234435 A1* 8/2019 Nakakura ............. F16D 55/228

* cited by examiner

WET CLUTCH LUBRICATION EVACUATION

FIELD OF THE DISCLOSURE

The present disclosure relates to a wet clutch. More particularly, the present disclosure relates to a wet clutch assembly assembled to a transmission and to a method for using the same.

BACKGROUND

A clutch can transfer power from a prime mover, such as an internal combustion engine or an electric motor, to a transmission and an output. In motor vehicle applications, the output may be the wheels or tracks of a drivetrain. In stationary applications, the output may be a pump, wench, auger, or another output.

Wet clutches have clutch fluid which circulates within and/or through the clutch housing and provides for cooling and/or lubrication of the clutch components. However, wet clutches are also prone to losing some energy to the clutch fluid, particularly when the clutch piston is not engaged such that the clutch plates are rotating relative to the piston. In some transmission systems, a wet clutch may operate in such a disengaged state during vehicle operation, such that energy losses arising become significant to overall vehicle efficiency.

SUMMARY

The present disclosure provides a wet clutch system including fluid-flow apertures in the clutch piston which allow for reduction of oil shear forces between rotating clutch plates and a stationary piston. In particular the apertures pass through the piston in the area of the piston's engagement with the clutch plates. When the piston is in its deactivated position and spaced from the clutch plates, the radially-outward position of these apertures allows high-pressure, centrifugally-driven clutch fluid to migrate away from the clutch plates through the piston to a backfill cavity on the opposite side of the piston. An air-inlet aperture may be provided in or near the clutch hub to facilitate this oil migration.

In one form, the present disclosure provides a clutch assembly including a housing, a clutch disposed within the housing rotatable relative thereto, the clutch having a frictional-engagement portion on at least one side thereof, and a piston having a piston hub and a wall extending radially outwardly from the piston hub. The wall of the piston has a first side facing the clutch that is configured to engage the frictional-engagement portion of the clutch, the first side cooperating with the housing to define a first fluid cavity. The wall of the piston has a second side opposite the first side that faces the housing to define a second fluid cavity, the piston having at least one aperture extending through the wall of the piston to selectively establish fluid communication between the first fluid cavity and the second fluid cavity, the at least one aperture disposed at a radial location overlapped by the frictional-engagement portion of the clutch such that the fluid communication is eliminated when the piston and the frictional-engagement portion of the clutch are in contact.

In another form, the present disclosure provides a method of operating a clutch, including delivering a lubricating fluid to a first cavity within a clutch housing, the first cavity containing a clutch plate having a friction area; delivering an actuation fluid to a second cavity with the clutch housing, the second cavity separated from the first cavity by a clutch piston having at least one aperture radially overlapped by the friction area; and delivering makeup air to the first cavity when fluid migrates from the first cavity to the second cavity through the at least one aperture.

BRIEF DESCRIPTION OF THE DRAWINGS

The above-mentioned and other features and advantages of this disclosure, and the manner of attaining them, will become more apparent and will be better understood by reference to the following description of exemplary embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
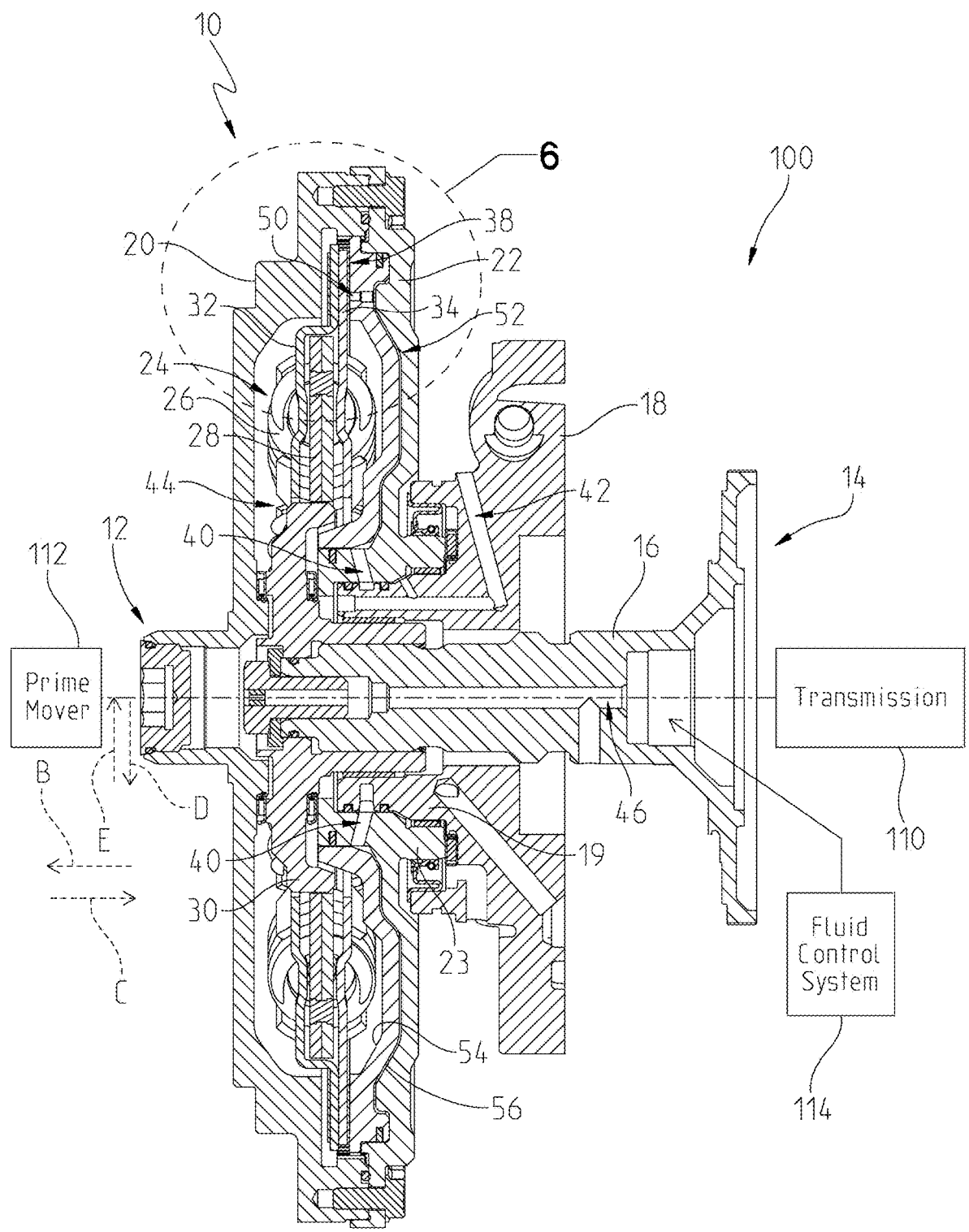
FIG. 1 is an elevation, cross-section view of a clutch assembly made in accordance with the present disclosure.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

FIG. 1 is a schematic representation of a motor vehicle 100 having a prime mover 112, such as an internal combustion engine or an electric motor, a clutch assembly 10, and a transmission 110 configured to power a drivetrain or another output (not shown). Clutch 10 is functionally interposed between prime mover 112 and transmission 110, such as by a drive shaft and driven shaft. In operation, clutch assembly 10 selectively transfers power from prime mover 112 to transmission 110 as further described below. Clutch 10 is a "wet clutch" design in which oil or another fluid circulates through the clutch components for lubrication and cooling. The clutch oil may be controlled by fluid control system 114, which may also circulate the fluid to other upstream or downstream components as further described below.

Figure 5:
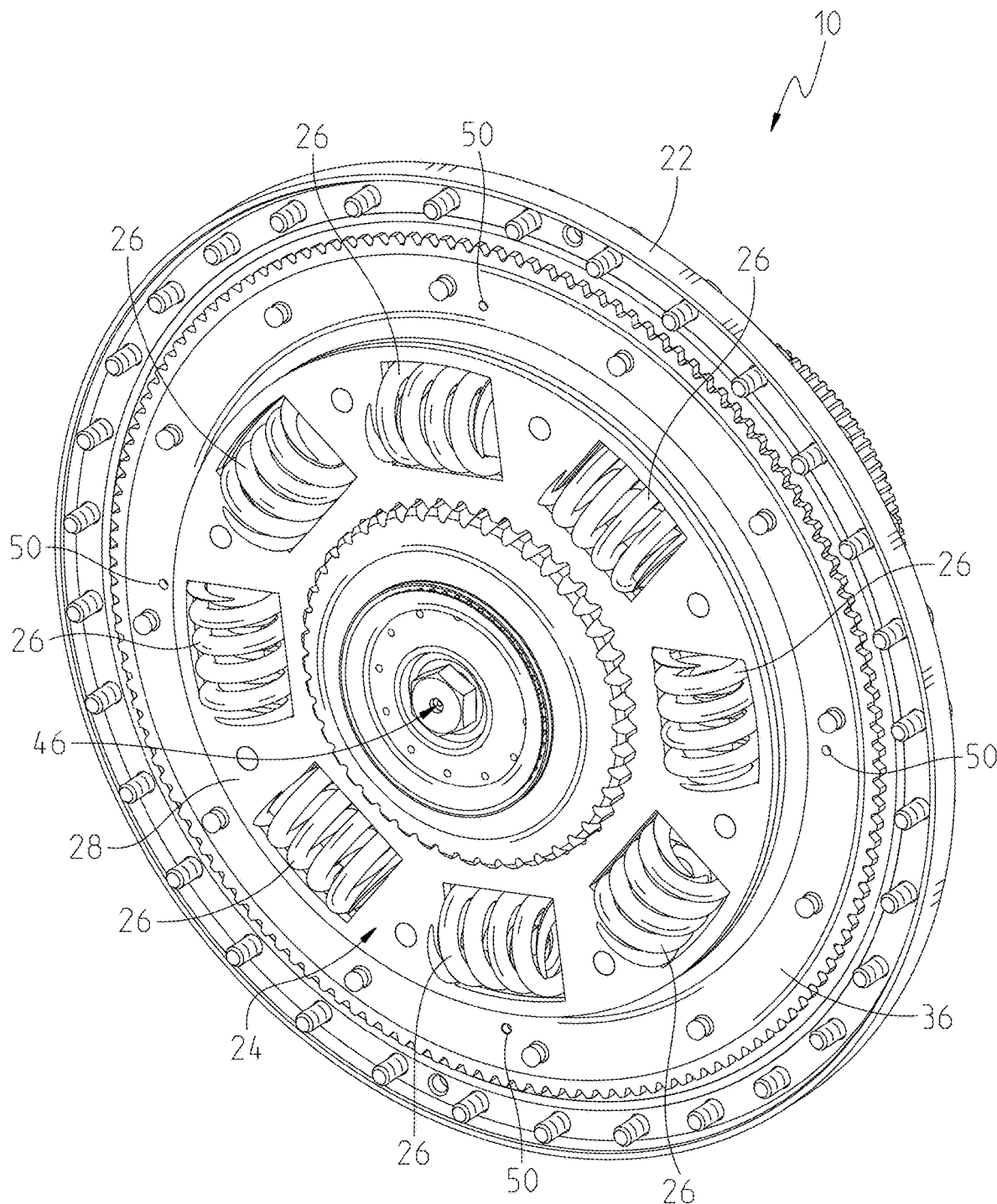
FIG. 5 is a perspective view of the clutch assembly of FIG. 1, with a portion of the housing removed to show internal components thereof.

Referring to FIGS. 1 and 5, clutch assembly 10 has a front end 12, a rear end 14, and a longitudinal axis of rotation A extending therebetween. Front end 12 of clutch 10 faces prime mover 112, and the opposing rear end 14 of clutch 10 faces transmission 110. In some applications, several other structures or assemblies may also be positioned between clutch assembly 10 and either prime mover 112 or transmission 110. For example, other transmission components utilizing the cooling/lubricating oil from fluid control system 114 may form a part of transmission 110, or may be functionally positioned between clutch rear end 14 of clutch 10 and transmission 110. In this way, the fluid delivered for clutch actuation (via passageway 40 described below) and the fluid delivered for clutch lubrication (via passageway 46 described below) may be a common fluid which also circulates as part of a larger circuit of fluid-powered or fluid-utilizing components, in which the common fluid is also used in connection with such other components.

The illustrative clutch assembly 10 is arranged circumferentially about axis A. For purposes of orientation in FIG. 1, a first arrow B is shown extending in an axially forward direction along axis A, a second arrow C is shown extending in an axially rearward direction along axis A, a third arrow D is shown extending in a radially outward direction from axis A, and a fourth arrow E is shown extending in a radially inward direction toward axis A.

Figure 3:
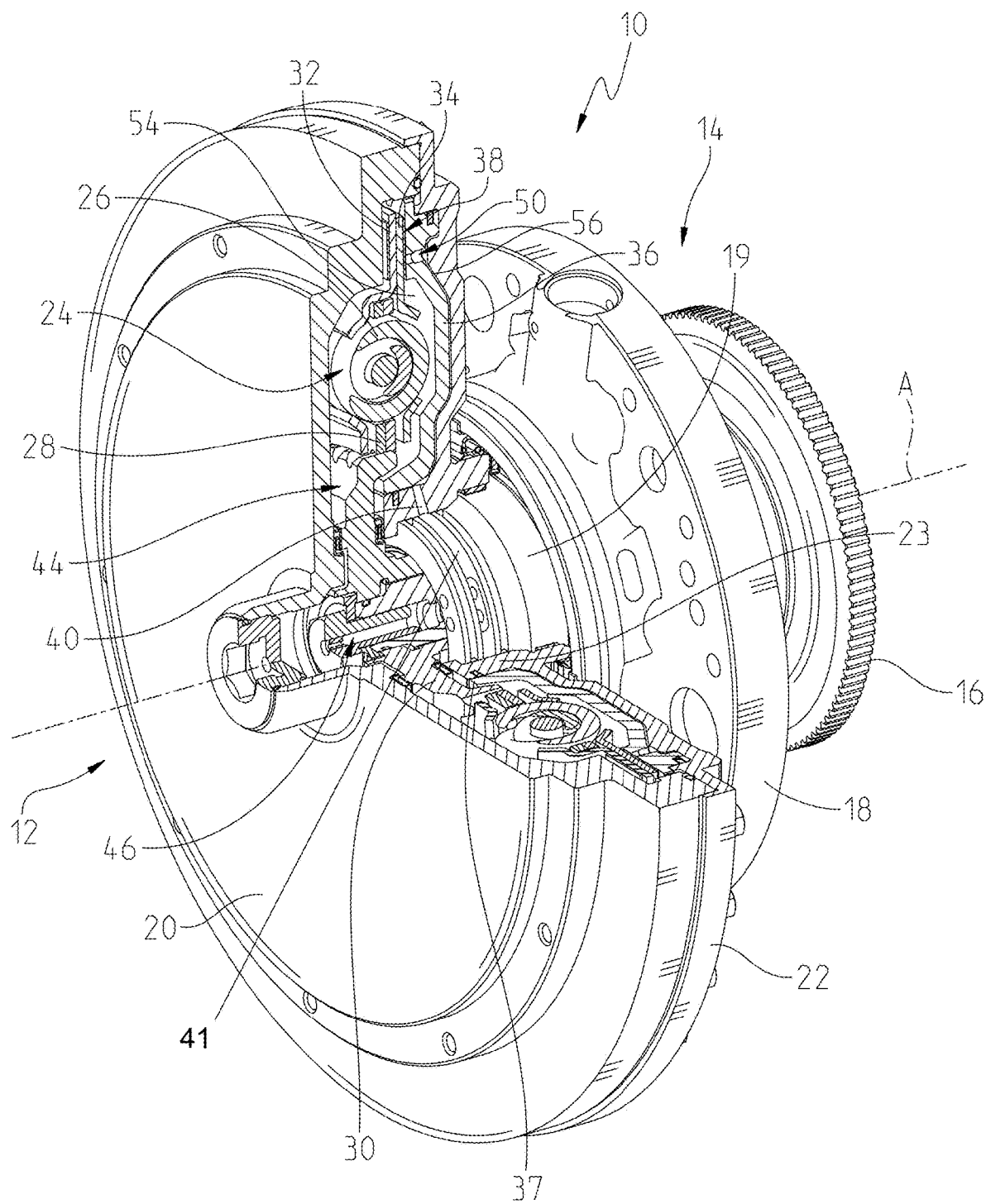
FIG. 3 is a perspective, partial section view of the clutch assembly of FIG. 1.
Figure 4:
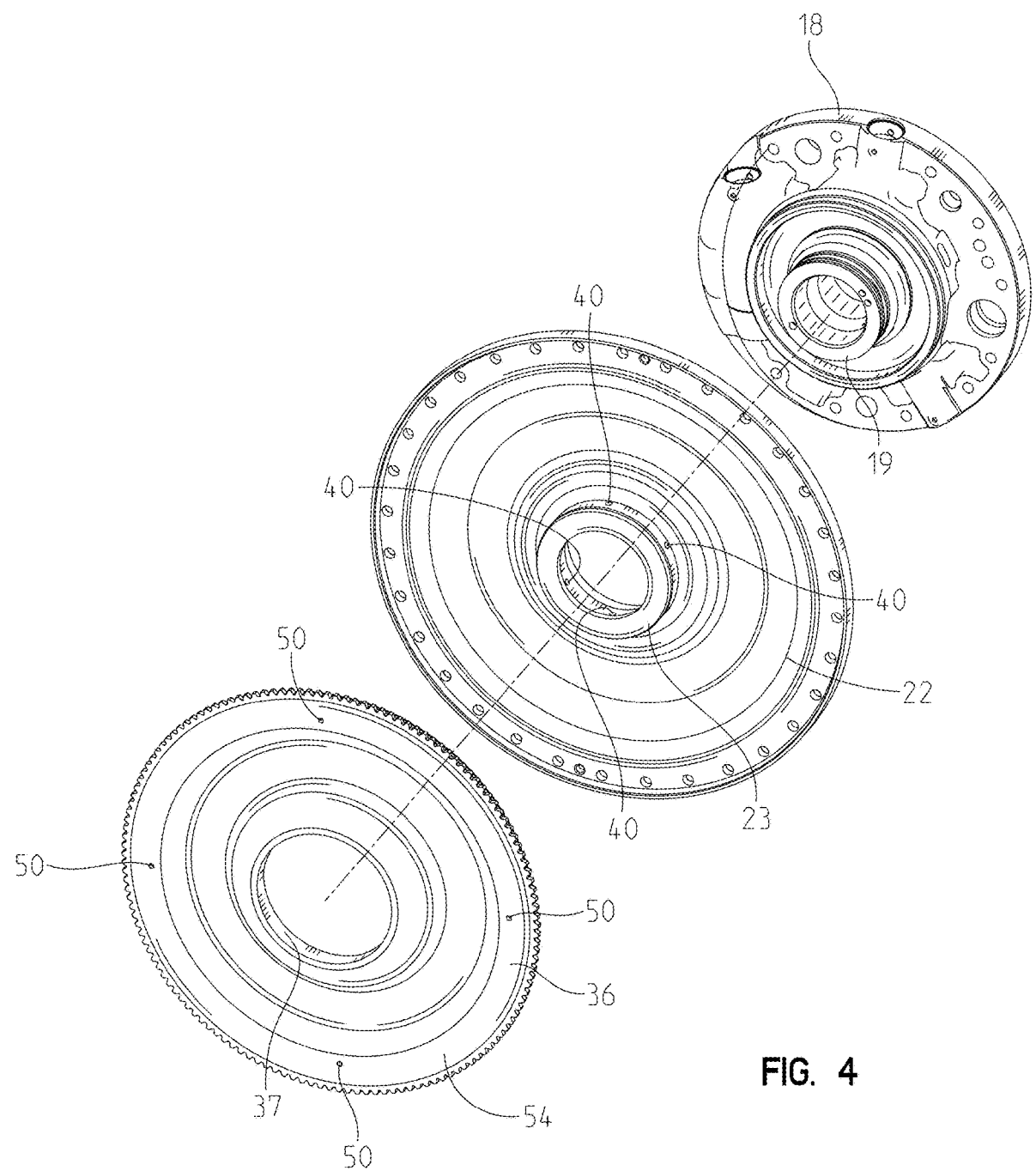
FIG. 4 is an exploded view of selected components of the clutch assembly of FIG. 1.

Referring now to FIGS. 1 and 3, clutch 10 includes forward housing 20 and rearward housing 22 which cooperate to contain damper assembly 24 mounted to hub 30, clutch plates 32, 34, piston 36 and a portion of spindle 16. Rearward housing 22 is rotatably mounted to a hub 19 of fluid manifold 18 (FIG. 4), which is rotatably fixed. Spindle 16 passes through hub 19 and is rotatable therewithin. A forward end of spindle 16 includes external splines which engage corresponding internal splines formed on hub 30, such that spindle 16 and hub 30 are rotatably fixed to one another. Damper assembly 24 is similarly rotatably fixed to another set of external splines formed on hub 30.

Figure 2:
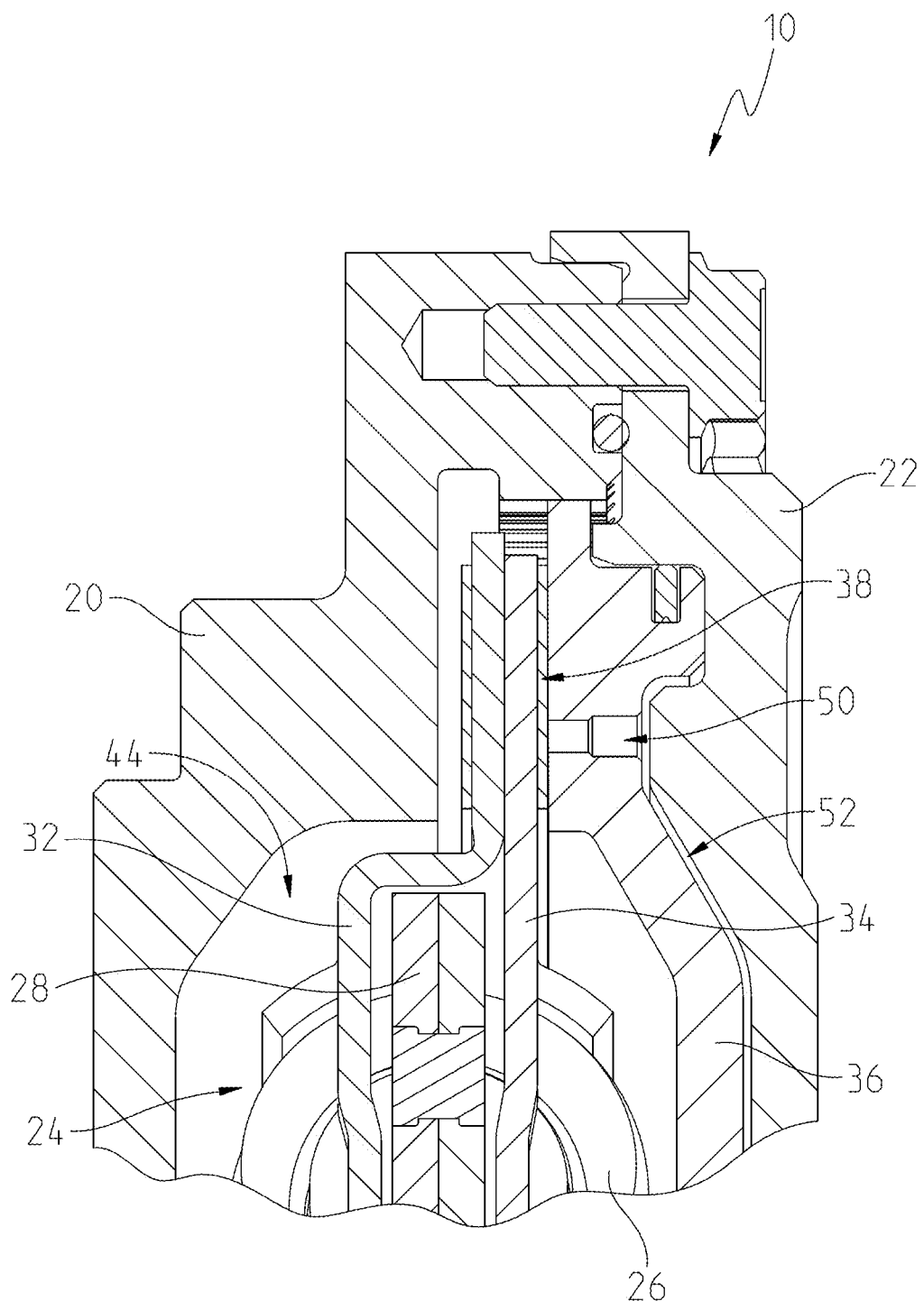
FIG. 2 is an elevation, cross-section view of a portion of the clutch assembly of FIG. 1.

Damper assembly 24 is functionally disposed between spindle 16 and clutch plates 32, 34. As best seen in FIG. 5, damper assembly 24 includes springs 26 and a spring retainer 28 rotatably coupled (e.g., by splines) to hub 30 such that spring retainer rotates together with spindle 16. In the illustrated embodiment, spring retainer 28 is composed of a pair of plates riveted to one another (FIGS. 1-3). When piston 36 is activated to rotatably couple clutch plates 32, 34 to housings 20, 22 (as further described below), sudden rotational acceleration of housings 20, 22 and any connected structures of vehicle 100 may be damped and slowed by damper assembly 24. More information regarding damper assembly 24 is set forth in U.S. Patent Application Publication No. 2015/0053528, the disclosure of which is expressly incorporated herein by reference in its entirety.

Clutch plates 32, 34 which may also be referred to more generally as a clutch, are rotatably fixed to hub 30 for rotation therewith, such that rotation of spindle 16 also drives clutch plates 32, 34. At least the rearward clutch plate 34 may have one or more roughened or frictional surfaces disposed near the outer periphery thereof, shown in FIGS. 1 and 2 at friction area 38.

Piston 36 is rotatably fixed to forward housing 20, but is axially translatable within housing 20. More specifically, piston 36 includes gear teeth formed at its outer periphery which mesh with inner splines formed in housing 20. Piston 36 is disposed axially between rearward housing 22 and rearward clutch plate 34 and is configured to move axially therebetween across hub 23 of housing 22, as discussed further below.

Piston 36 includes a wall extending radially outwardly from its hub 37, the wall having a front side 54 and an opposing rear side 56. Front side 54 of piston 36 faces axially forward toward prime mover 112, so this front side 54 may also be referred to as the "engine side" of piston 36. Rear side 56 of piston 36 faces axially rearward toward transmission 110, so this rear side 56 may also be referred to as the "transmission side" of piston 36.

Piston 36 divides the interior of clutch 10 into a forward fluid cavity 44 and a rearward fluid cavity 52. Forward fluid cavity 44 is bounded by front side 54 of piston 36, forward housing 20, and the arrangement of hubs 19, 23 and spindle 16 at its radially interior portion. Forward fluid cavity 44 acts as a lubrication fluid cavity through which lubrication fluid is allowed to flow and circulated during operation of clutch 10. In the illustrated embodiment, lubrication fluid is received from fluid control system 114 via lubrication passage 46 passing through spindle 16. This fluid is allowed to pass into cavity 44, cooling and lubricating the moving parts therein as discussed above. The fluid may be allowed to exit cavity 44 through one or more exhaust passages (not shown), creating a fluid circulation within cavity 44.

Rearward fluid cavity 52 is bounded by rear side 56 of piston 36 and rearward housing 22. Fluid is pumped into cavity 52 by fluid control system 114 via one or more actuation passages 40 to create a fluid pressure on rear side 56 of clutch piston 36. In the exemplary embodiment of FIG. 4, four passages 40 are evenly distributed about hub 23 and passageway 41 (FIG. 3) of housing 22. When this fluid pressure exceeds the pressure of the fluid within cavity 44, piston 36 advances forwardly into engagement with friction area 38 of clutch plate 34. This friction created by this engagement rotatably couples clutch plates 32, 34 to piston 36, thereby creating a rotatable coupling between spindle 16 and housings 20, 22. In this configuration, clutch 10 is actuated such that torque is transferred between prime mover 112 and transmission 110. In this actuated configuration, springs 26 of damper assembly 24 may compress relative to spring retainer 28 (FIG. 5) to dampen torque loads between prime mover 112 and transmission 110.

Similarly, fluid pressure within cavity 52 may be reduced to allow piston 36 to advance forwardly away from friction area 38 of clutch plate 34. In this configuration, clutch 10 is disengaged such that no significant torque is transferred between prime mover 112 and transmission 110. As described further below, apertures 50 formed in piston 36 cooperate with the various fluid passageways 40, 42 and 46 to further minimize torque transfer when clutch 10 is disengaged, thereby promoting efficient operation.

Housings 20 and 22 cooperate with other system components to hermetically seal forward fluid cavity 44 and rearward cavity 52 from the ambient environment, except for deliberate introduction and exhaust of fluid through passageways 40, 42 and 46 as described herein. In the illustrated embodiment, the other components which participate in the hermetic sealing of cavities 44 and 52 include hub 30 and hub 19 of fluid distribution manifold 18, though other arrangements may also be employed as required or desired for a particular application of the present technology.

Figure 7:
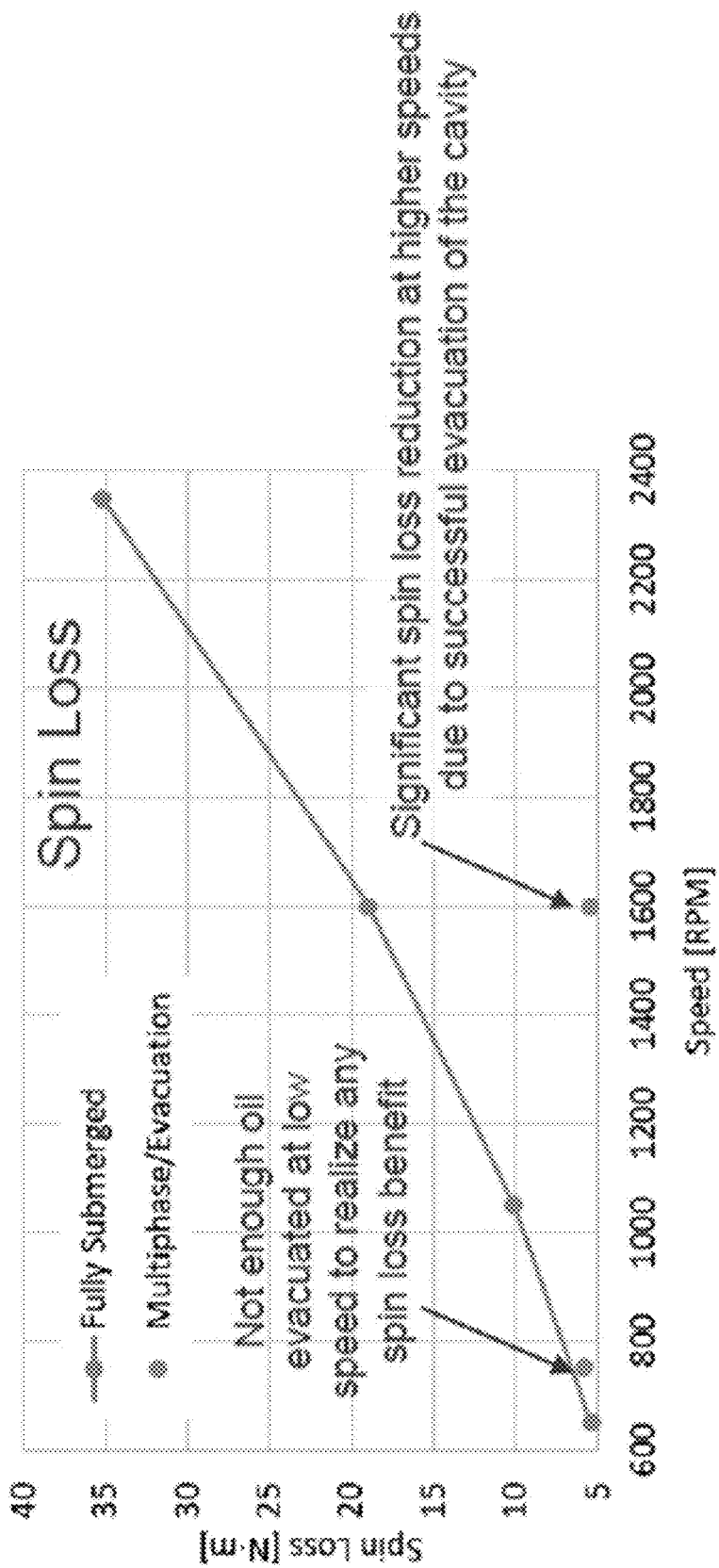
FIG. 7 is a graph, shown according to scale, of energy losses to clutch fluid, shown as a function of clutch plate rotation speed, both with and without clutch piston apertures in accordance with the present disclosure.

In addition, forward fluid cavity 44 and rearward cavity 52 are hermetically sealed with respect to one another by piston 36, except that an array of apertures 50 formed through the wall of piston 36 may allow for fluid flow between cavities 44 and 52. In the exemplary embodiment of FIG. 4, four apertures 50 are formed 90 degrees apart from one another and at a common radial distance from hub 37. During operation of vehicle 100, spindle 16 may rotate while piston 36 is disengaged from clutch plates 32, 34 such that friction area 38 of the clutch plates 32, 34 spin in close proximity to the corresponding engagement surface of piston 36. This creates shear-driven transmission of forces between piston 36 to clutch plates 32, 34 via the fluid therebetween ("spin loss"). Furthermore, the faster the plates 32, 34 spin relative to piston 36 (e.g., during operation of vehicle 100), the greater the magnitude of such spin loss. For example, FIG. 7, shows expected spin loss as a function of rotational speed. As shown in the "fully submerged" scenario which pertains to conventional clutch designs, spin loss climbs to significant levels as rotational speed increases.

Figure 6:
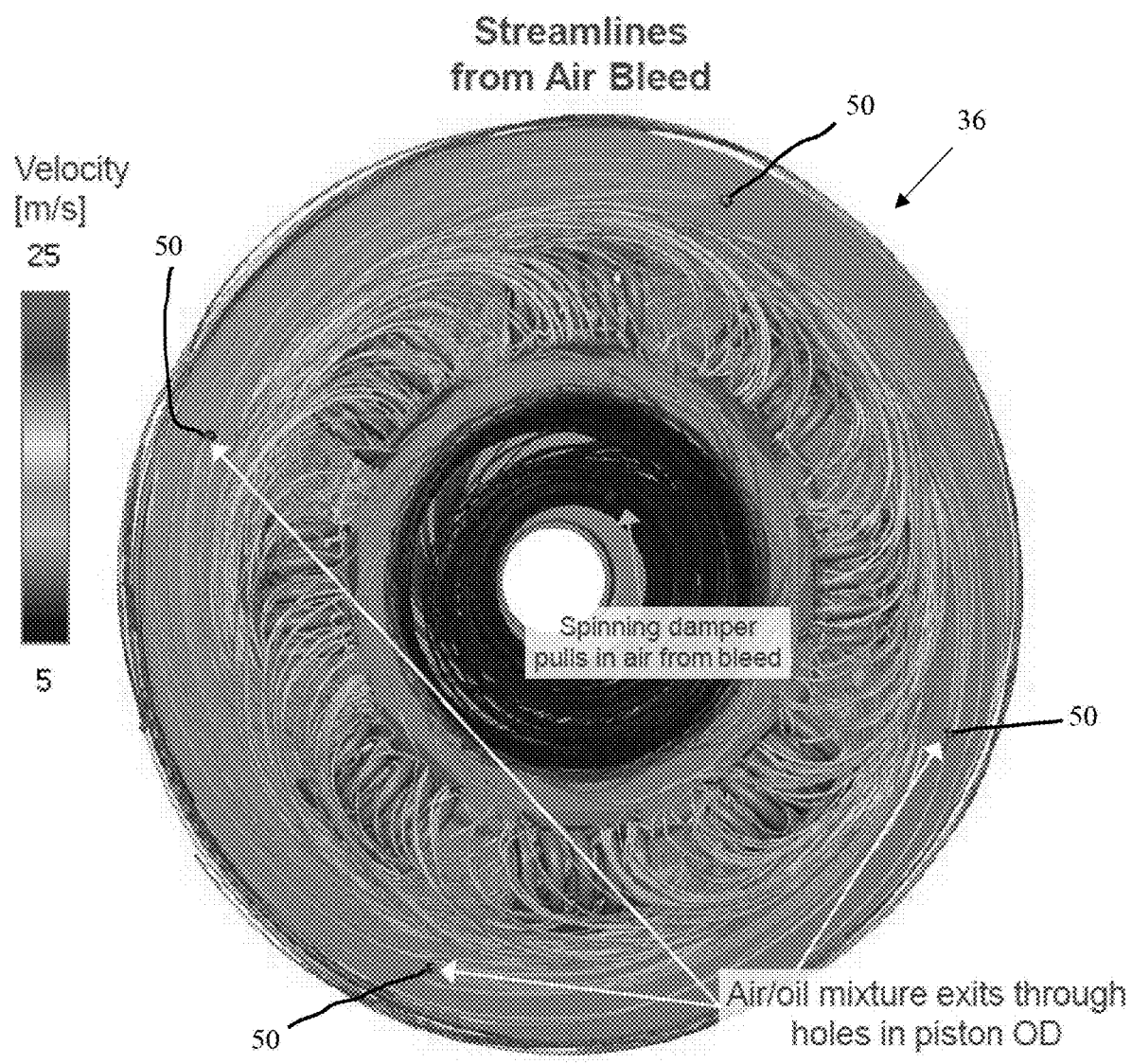
FIG. 6 is a schematic view illustrating fluid flow patterns through the clutch assembly of FIG. 1.

However, in the present clutch assembly 10, apertures 50 allow fluid to migrate from fluid cavity 44 through piston 36 (i.e., from front side 54 to rear side 56) when clutch 10 is in the disengaged state. Higher rotational speeds of clutch plates 32, 34 leads to correspondingly higher pressures of fluid near the outer diameters of clutch plates 32, 34, piston 36 and housings 20, 22 due to centrifugal acceleration of the fluids contained within cavity 44. These higher pressures may be relieved by migration of fluid through apertures to cavity 52, which acts as a backfill area during disengaged operation. Referring to FIG. 7, clutch 10 including apertures 50 essentially eliminate the increase in spin loss due to high speeds, with the spin loss being about the same at both 750 rpm and 1600 rpm. FIG. 6 shows a schematic representation of fluid flow within cavity 44 during rotation of clutch plates 32, 34 when clutch 10 is disengaged, illustrating the flow of fluid through apertures 50. As rotational speed of the clutch increases, the amount of fluid migrating to the rearward cavity 52 from the forward cavity 44 naturally increases as a function of the speed (i.e., as a result of increasing centrifugal pressure), thereby alleviating any increase of spin loss which might otherwise occur.

This migration of fluid is facilitated by fluid passageway 40, which allows any preexisting fluid within cavity 52 to be displaced by the incoming high-pressure fluid from cavity 44. Pressurized fluid, normally provided via fluid passageway 40 for actuation of piston 36 as described above, is discontinued by deactivation via fluid control system 114, thereby allowing fluid to "backflow" or pass the other way through passageway 40 and back into fluid manifold 18.

In addition, makeup air passage 42 is formed through fluid manifold 18 to establish fluid communication between lubrication fluid cavity 44 and the ambient air outside housings 20, 22. When fluid is migrating through apertures 50 into cavity 52, air may be allowed to be drawn through passage 42 to relieve any vacuum which might otherwise result from the evacuation of fluid from cavity 44, thereby facilitating the friction-relief function of apertures 50.

As best seen in FIG. 2, each aperture 50 may include a counterbore with a rounded bottom at its rearward end. This counterbore is sized to accept a ball (not shown) to form a check valve which prevents a reverse flow of fluid from backfill cavity 52 back into fluid cavity 44. This may be useful, for example, in preventing an unintentional or undesired flow of fluid through apertures 50 during actuation of piston 36 when pressures in cavity 52 are higher than in cavity 44.

Referring still to FIG. 2, apertures 50 are disposed at a radial location on piston 36 near its outer periphery, and overlapping the radial extent of friction area 38 on clutch plate 34. The position near the outside periphery place apertures 50 in the area of maximum pressure during operation of clutch 10, where the highest fluid pressures are developed as clutch plates 32, 34 rotate relative to piston 36. In an exemplary embodiment, the apertures 50 are all positioned in the outer third of the radial extent of piston 36. Stated another way, apertures are disposed between the outer piston diameter and a radial position equal to ⅔rds of the outer piston diameter. Because the outer diameter of the clutch plates 32, 34 are approximately the same as that of piston 36, friction area 38 is also disposed in the outer third of plate 34. In the illustrated embodiment, apertures 50 and friction area 38 are in the outer 10% of piston 36 and clutch plate 34, respectively, meaning these features are between the outer diameter and a radial position equal to 90% of the outer diameter.

The overlap between apertures 50 and friction area 38 also ensures that the fluid pathway through apertures 50 closes when piston 36 is engaged with pates 32, 34 and clutch is in the actuated configuration. Advantageously, this configuration ensures that no fluid will "leak" or otherwise pass unintentionally from cavity 52 to cavity 44 through apertures 50 when clutch 10 is activated.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A clutch assembly comprising:
 a housing;
 a clutch disposed within the housing rotatable relative thereto, the clutch having a frictional-engagement portion on at least one side thereof; and
 a piston having a piston hub and a wall extending radially outwardly from the piston hub,
  the wall of the piston having a first side facing the clutch and configured to engage the frictional-engagement portion of the clutch to selectively rotatably couple the piston and the clutch, the first side cooperating with the housing to define a first fluid cavity, and
  the wall of the piston having a second side opposite the first side and facing the housing to define a second fluid cavity, the piston having at least one aperture extending through the wall of the piston to selectively establish fluid communication between the first fluid cavity and the second fluid cavity, the at least one aperture disposed at a radial location overlapped by the frictional-engagement portion of the clutch such that the fluid communication is eliminated when the piston and the frictional-engagement portion of the clutch are in contact,
 a first fluid passageway extending into the first fluid cavity, such that the first fluid passageway is configured to deliver lubricating fluid to the clutch,
 a second fluid passageway extending into the second fluid cavity, such that the second fluid passageway is configured to deliver actuation fluid to the piston, and
 a third fluid passageway extending between the first fluid cavity and an ambient air around the clutch assembly, such that the third fluid passageway is configured to deliver makeup air to the first fluid cavity upon fluid migration from the first fluid cavity to the second fluid cavity.

2. The clutch assembly of claim 1, further comprising a fluid control system,
the fluid control system configured to deliver a flow of the lubricating fluid to the first fluid cavity through the first fluid passageway,
the fluid control system configured to deliver a flow of the actuation fluid to the second fluid cavity through the second fluid passageway, and
the fluid control system configured to allow a backflow of the actuation fluid from the second fluid cavity through the second fluid passageway.

3. The clutch assembly of claim 2, wherein the lubricating fluid and the actuation fluid a common fluid which also circulates to components external of the clutch assembly.

4. The clutch assembly of claim 1, further comprising a fluid manifold having a manifold hub, wherein:
the housing including a housing hub rotatably mounted to the manifold hub, the housing further including a housing wall extending radially outwardly from the housing hub, the second fluid passageway extending through the housing hub and in fluid communication with a first fluid distribution passageway formed in the fluid manifold;
the first fluid passageway extending through a second fluid distribution passageway extending through the fluid manifold, the first and second distribution fluid passageways fluidly isolated from one another within the fluid manifold.

5. The clutch assembly of claim 1, wherein:
the clutch defines an outer clutch diameter, the frictional-engagement portion contained within an outer third portion of the clutch between the outer clutch diameter and a radial position equal to ⅔rds of the outer clutch diameter; and
the piston defines an outer piston diameter, the at least one aperture formed in an outer third portion of the piston between the outer piston diameter and a radial position equal to ⅔rds of the outer piston diameter.

6. The clutch assembly of claim 5, wherein:
the frictional-engagement portion is contained within an outer 10% of the clutch, between the outer clutch diameter and a radial position equal to 90% of the outer clutch diameter; and
the at least one aperture is formed within an outer 10% of the piston, between the outer piston diameter and a radial position equal to 90% of the outer piston diameter.

7. The clutch assembly of claim 1, wherein the at least one aperture comprises a plurality of apertures equally spaced from one another and positioned at a common radial distance from the piston hub.

8. The clutch assembly of claim 7, wherein the plurality of apertures comprises four apertures each spaced 90 degrees apart from each neighboring aperture.

9. The clutch assembly of claim 1, wherein the piston is rotatably fixed to the housing and axially moveable within the housing between actuated and deactivated positions.

10. The clutch assembly of claim 1, further comprising a damper assembly contained within the first fluid cavity.

11. The clutch assembly of claim 10, wherein the damper assembly comprises at least one spring coupled to a spring retainer, the spring retainer rotatably fixed to the clutch.

12. The clutch assembly of claim 11, further comprising:
a spindle, the clutch and the damper assembly rotatably fixed to the spindle; and
a fluid manifold having a manifold hub, the housing including a housing hub rotatably mounted to the manifold hub, the housing further including a housing wall extending radially outwardly from the housing hub.

13. The clutch assembly of claim 12, further comprising:
a first fluid passageway extending axially through the manifold hub into the first fluid cavity, such that the first fluid passageway is configured to deliver lubricating fluid to the clutch; and
a second fluid passageway extending radially through the manifold hub into the second fluid cavity, such that the second fluid passageway is configured to deliver actuation fluid to the piston.

14. A method of operating a clutch, comprising:
delivering a lubricating fluid to a first cavity within a clutch housing, the first cavity containing a clutch plate having a friction area;
delivering an actuation fluid to a second cavity with the clutch housing, the second cavity separated from the first cavity by a clutch piston having at least one aperture radially overlapped by the friction area; and
delivering makeup air to the first cavity when fluid migrates from the first cavity to the second cavity through the at least one aperture.

15. The method of claim 14, further comprising actuating the clutch piston with the actuation fluid, the step of actuating causing the at least one aperture to be blocked by the friction area such that fluid can no longer migrate from the first cavity to the second cavity through the at least one aperture.

16. The method of claim 14, further comprising:
rotating the clutch plate with respect to the clutch housing while the clutch piston is disengaged from the friction area of the clutch plate; and
allowing the fluid to migrate from the first cavity as a function of a rotational speed of the clutch plate.

17. The method of claim 14, wherein the lubricating fluid and the actuation fluid are a common fluid delivered by a fluid control system.

18. The method of claim 17, wherein the fluid control system also controls additional transmission systems external of the clutch with the common fluid.

19. A clutch assembly comprising:
a housing;
a clutch disposed within the housing rotatable relative thereto, the clutch having a frictional-engagement portion on at least one side thereof; and
a piston having a piston hub and a wall extending radially outwardly from the piston hub,
the wall of the piston having a first side facing the clutch and configured to engage the frictional-engagement portion of the clutch, the first side cooperating with the housing to define a first fluid cavity, and
the wall of the piston having a second side opposite the first side and facing the housing to define a second fluid cavity, the piston having at least one aperture extending through the wall of the piston to selectively establish fluid communication between the first fluid cavity and the second fluid cavity, the at least one aperture disposed at a radial location overlapped by the frictional-engagement portion of the clutch such that the fluid communication is eliminated when the piston and the frictional-engagement portion of the clutch are in contact, a first fluid passageway extending into the first fluid cavity, such that the first fluid passageway is configured to deliver lubricating fluid to the clutch, a second fluid passageway extending into the second fluid cavity, such that the second fluid passageway is configured to deliver actuation fluid to the piston, and a third fluid passageway extending between the first fluid cavity and an ambient air around the clutch assembly, such that the third fluid passageway is configured to deliver makeup air to the first fluid cavity upon fluid migration from the first fluid cavity to the second fluid cavity.

20. The clutch assembly of claim 19, further comprising a fluid control system, the fluid control system configured to deliver a flow of the lubricating fluid to the first fluid cavity through the first fluid passageway, the fluid control system configured to deliver a flow of the actuation fluid to the second fluid cavity through the second fluid passageway, and the fluid control system configured to allow a backflow of the actuation fluid from the second fluid cavity through the second fluid passageway.

21. The clutch assembly of claim 20, wherein the lubricating fluid and the actuation fluid a common fluid which also circulates to components external of the clutch assembly.

\* \* \* \* \*